(12) United States Patent
To et al.

(10) Patent No.: US 7,558,588 B2
(45) Date of Patent: Jul. 7, 2009

(54) RESOURCE ALLOCATION IN A RADIO ACCESS NETWORK

(75) Inventors: Philip To, Burlington, MA (US); Tugay Eyceoz, Nashua, NH (US)

(73) Assignee: Airvana, Inc., Chelmsford, MA (US)

( * ) Notice: Subject to any disclaimer, the term of this patent is extended or adjusted under 35 U.S.C. 154(b) by 374 days.

(21) Appl. No.: 11/282,996

(22) Filed: Nov. 18, 2005

(65) Prior Publication Data

US 2007/0115896 A1 May 24, 2007

(51) Int. Cl.
*H04B 7/00* (2006.01)
*H04M 1/00* (2006.01)
*H04B 1/38* (2006.01)
*H04W 72/00* (2009.01)

(52) U.S. Cl. .................. 455/512; 455/509; 455/514; 455/450; 455/550.1; 455/561

(58) Field of Classification Search ... 455/435.1–435.3, 455/450–454, 432.3, 464, 509–510, 512–515, 455/527, 550.1, 556.2, 561; 370/322, 328–329, 370/338, 341, 348, 351, 395.2, 395.3, 395.4, 370/395.42, 395.43, 431, 444, 447, 461–462; 709/226, 228, 229, 240
See application file for complete search history.

(56) References Cited

U.S. PATENT DOCUMENTS

| 6,529,907 | B1 * | 3/2003 | Terakura et al. .............. 707/9 |
| 6,711,144 | B1 | 3/2004 | Kim et al. |
| 6,731,618 | B1 | 5/2004 | Chung et al. |
| 6,741,862 | B2 | 5/2004 | Chung et al. |
| 6,781,999 | B2 | 8/2004 | Eyuboglu et al. |
| 6,834,341 | B1 * | 12/2004 | Bahl et al. .................. 713/156 |
| 6,961,323 | B1 * | 11/2005 | Xu et al. .................... 370/329 |
| 7,054,938 | B2 * | 5/2006 | Sundqvist et al. ........... 370/235 |
| 7,170,871 | B2 | 1/2007 | Eyuboglu et al. |
| 7,200,391 | B2 | 4/2007 | Chung et al. |
| 7,242,958 | B2 | 7/2007 | Chung et al. |
| 7,263,377 | B1 * | 8/2007 | Wahlstrom et al. ......... 455/512 |
| 7,277,446 | B1 | 10/2007 | Abi-Nassif et al. |
| 7,299,278 | B2 | 11/2007 | Ch'ng |
| 2002/0196749 | A1 | 12/2002 | Eyuboglu et al. |
| 2003/0037146 | A1 * | 2/2003 | O'Neill ..................... 709/226 |
| 2003/0100311 | A1 | 5/2003 | Chung et al. |
| 2004/0083287 | A1 * | 4/2004 | Gao et al. .................. 709/226 |
| 2004/0208183 | A1 * | 10/2004 | Balachandran et al. . 370/395.21 |
| 2005/0213555 | A1 | 9/2005 | Eyuboglu et al. |
| 2005/0243749 | A1 | 11/2005 | Mehrabanzad et al. |
| 2005/0245279 | A1 | 11/2005 | Mehrabanzad et al. |

(Continued)

OTHER PUBLICATIONS

3rd Generation Partnership Project 2 "3GPP2", "3GPP2 Access Network Interfaces Interoperability Specification", Revision A (3G-IOSv4.1), Post SDO Ballot, Pre SDO Publication Version), 3GPP2 A.S0001-A, version 2, Jun. 2001 (1046 pages).

(Continued)

*Primary Examiner*—Meless N Zewdu
(74) *Attorney, Agent, or Firm*—Fish & Richardson P.C.

(57) ABSTRACT

In a radio access network, techniques for enabling the network to provide a service availability guarantee to a user of a premium service without requiring the network to identify a priority level of a connection with an access terminal associated with the premium service user prior to connection establishment.

28 Claims, 5 Drawing Sheets

U.S. PATENT DOCUMENTS

| | | |
|---|---|---|
| 2006/0067422 A1 | 3/2006 | Chung |
| 2006/0067451 A1 | 3/2006 | Pollman et al. |
| 2006/0126509 A1 | 6/2006 | Abi-Nassif |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0026884 A1 | 2/2007 | Rao |
| 2007/0058628 A1 | 3/2007 | Rao et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |

OTHER PUBLICATIONS

Bender, P. et al., "CDMA/HDR: A Bandwith-Efficient High-Speed Wireless Data Service for Nomadic Users", IEEE Communications Magazine, Jul. 2000.

3GPP2, "Draft Baseline Text for 1xEV-DO," Aug. 21, 2000.

TIA/EIA/IS-2000-A, "Interoperability Specification (IOS) for CDMA2000 Network Access Interfaces," Aug. 2001. (Note: This reference is a revision of TIA/EIA/IS-2001, May 2000 Specification).

TIA/EIA/TSB-115, "Wireless IP Architecture Based on IETF Protocols," Jun. 6, 2000.

TIA/EIA/IS-835, "Wireless IP Network Standard," $3^{rd}$ Generation Partnership Project 2 (3GPP2), Version 1.0, Jul 14, 2000.

TIA/EIA/IS-856, "CDMA2000 High Rate Packet Data Air Interface Specification," 3GPP2 C.S0024-0, Version 4.0, Oct. 25, 2002.

TIA/EIA/IS-856, "CDMA2000 High Rate Packet Data Air Interface Specification," 3GPP2 C.S0024-A, Version 1.0, Mar. 2004.

\* cited by examiner $N_{CE}$ = number of connection resources available for a given sector
$T_{premium}$ = number of connection resources reserved for allocation to high priority level connections
$T_{buffer}$ = number of connection resources reserved for use as staging area

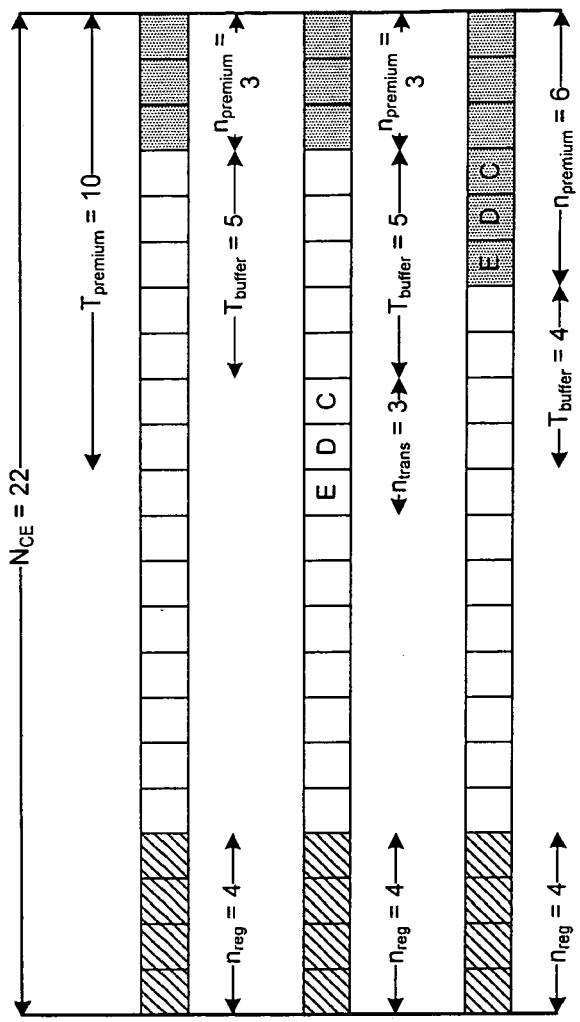

RESOURCE ALLOCATION IN A RADIO ACCESS NETWORK

TECHNICAL FIELD

This disclosure relates to resource allocation in a radio access network.

BACKGROUND

High Data Rate (HDR) is an emerging mobile wireless access technology that enables personal broadband Internet services to be accessed anywhere, anytime (see P. Bender, et al., "CDMA/HDR: A Bandwidth-Efficient High-Speed Wireless Data Service for Nomadic Users", IEEE Communications Magazine, July 2000, and 3GPP2, "Draft Baseline Text for 1xEV-DO," Aug. 21, 2000). Developed by Qualcomm, HDR is an air interface optimized for Internet Protocol (IP) packet data services that can deliver a shared forward link transmission rate of up to 2.46 Mbit/s per sector using only (1x) 1.25 MHz of spectrum. Compatible with CDMA2000 radio access (TIA/EIA/IS-2001, "Interoperability Specification (IOS) for CDMA2000 Network Access Interfaces," May 2000) and wireless IP network interfaces (TIA/EIA/TSB-115, "Wireless IP Architecture Based on IETF Protocols," Jun. 6, 2000, and TIA/ELA/IS-835, "Wireless IP Network Standard," 3rd Generation Partnership Project 2 (3GPP2), Version 1.0, Jul. 14, 2000), HDR networks can be built entirely on IP technologies, all the way from the mobile Access Terminal (AT) to the global Internet, thus taking advantage of the scalability, redundancy and low-cost of IP networks.

HDR has been adopted by Telecommunication Industry Association (TIA) as a new standard in the CDMA2000 family, an EVolution of the current 1xRTT standard for high-speed data-only (DO) services, commonly referred to as 1xEV-DO, Rev. 0 and standardized as TIA/EIA/IS-856, "CDMA2000 High Rate Packet Data Air Interface Specification," 3GPP2 C.S0024-0, Version 4.0, Oct. 25, 2002, which is incorporated here by reference. Revision A to this specification has been published as TIA/EIA/IS-856, "CDMA2000 High Rate Packet Data Air Interface Specification," 3GPP2 C.S0024-A, Version 1.0, March 2004, Ballot Resolution, but has yet not been adopted. Revision A is also incorporated here by reference.

A 1xEV-DO radio access network (RAN) includes access terminals in communication with radio nodes over airlinks. Each access terminal may be a laptop computer, a Personal Digital Assistant (PDA), a dual-mode voice/data handset, or another device, with built-in 1xEV-DO support. The radio nodes are connected to radio node controllers over a backhaul network that can be implemented using a shared IP or metropolitan Ethernet network which supports many-to-many connectivity between the radio nodes and the radio node controllers. The radio access network also includes a packet data serving node, which is a wireless edge router that connects the RAN to the Internet.

1xEV-DO, Rev. 0 radio access networks handle all connections with access terminals in an identical manner. Network resources are allocated to connections on a first-come-first-served basis. If there are insufficient network resources available when a connection request is received, the connection request is denied.

One feature that can be enabled by 1xEV-DO, Rev. A radio access networks is classification of connections into priority levels (e.g., high priority level or low priority level) based on quality of service (QoS) requirements. Network operators of QoS-enabled radio access networks can implement a tier pricing structure commensurate with different guaranteed levels of connection-based performance, such as bandwidth, call blocking rate, and call drop rate. Examples of ways in which a QoS-enabled radio access network can be used include priority level classification based on static information (e.g., a user subscription level or an access terminal type), dynamic information (e.g., a requested QoS service type), or both.

In one example of priority level classification based on static information, user profiles each indicating a subscription level (e.g., gold, silver, or bronze) of a user and/or a type of access terminal (e.g., Rev. 0 access terminal or Rev. A access terminal) that is associated with the user are communicated to the radio access network by the packet data serving node. When a connection request is received by the radio access network from an access terminal, the radio access network accesses the user profile associated with the access terminal making the connection request and classifies the connection as being a high or low priority level connection based on the user subscription level and/or access terminal type. For example, connections requested by Rev. 0 access terminals are classified as low priority level connections and connections requested by Rev. A access terminals are classified as high priority level connections. This form of priority level classification may result in low resource utilization if the resources allocated to the high priority level connections between the Rev. A access terminals and the radio access network are not fully utilized (e.g., the Rev. A access terminal is configured to support delay sensitive services but those services are not used during the lifetime of the connection), while connection attempts made by Rev. 0 access terminals are denied due to insufficient network resource availability.

In one example of priority level classification based on dynamic information, the radio access network supports premium services, such as delay sensitive services (e.g., a push-to-talk service or a Voice over IP service). In order to guarantee a certain level of performance to users of premium services ("premium users"), the radio access network needs to distinguish the premium users from users of best effort services ("regular users"). To do so, the radio access network relies on the signaling behavior of access terminals (e.g., in accordance with the Generic Attribute Update Protocol defined in the TIA/EIA/IS-856, Rev. A standard) to indicate whether a premium service is being activated. The signaling behavior of some access terminals negotiates and activates premium services during session configuration before setting up a connection. Other access terminals are configured such that the signaling behavior negotiates and activates premium services after the connection is established. In the latter case, the radio access network may be unable to identify an access terminal as being operated by a premium user during resource allocation and deny the connection attempt if there are insufficient network resources available. This may result in a failure to satisfy a service availability guarantee to premium users.

SUMMARY

In one aspect, the invention features a method that enables a radio access network to provide a service availability guarantee to a user of a premium service without requiring the radio access network to identify a priority level of a connection with an access terminal associated with the premium service user prior to connection establishment.

Implementations of the invention may include one or more of the following. The method may include establishing a session for the access terminal on the radio access network; and identifying the priority level of the connection based on session information. The session may be established prior to or after connection establishment. The session information may include an activated service identifier, such as a premium service identifier or a regular service identifier. The priority level of the connection may be identified as one of at least two priority levels, such as a low priority level or a high priority level.

The method may include allocating a resource of the radio access network to the connection based on the priority level of the connection. The method may include establishing a connection with the access terminal; and maintaining the connection for a period of time while the priority level of the connection is identified. The method may include determining whether a resource of the radio access network is to be allocated to the connection based on the priority level identification. The method may include determining whether a resource of the radio access network is available for allocation to the connection based on the priority level identification. The method may include terminating the connection if the priority level of the connection cannot be identified within the period of time. The method may include terminating a first connection in order to reclaim an allocated resource of the radio access network for subsequent allocation to a second connection, the second connection having a relatively higher priority level than the first connection.

In another aspect, the invention features a method in which, in a radio access network having N resources of which M are reserved for new connection establishment, providing a service availability guarantee that enables the radio access network to allocate at least K resources to connections associated with users of premium services, and allocate up to N-M resources to connections associated with users of regular services.

In other aspects, corresponding computer programs and apparatus are also provided.

Advantages that may be exhibited by particular implementations of the invention include one or more of the following. Network operators can accurately identify a premium user without having to rely on specific signaling behaviors of the premium user's access terminal. Once identified, the connection established between the premium user's access terminal is classified as a high priority level connection and resources are allocated such that a desired and/or required level of connection-based performance is guaranteed. The numbers of high and low priority level connections established at any given time can be easily adapted to optimize resource utilization, while ensuring that high priority level connections are provided with sufficient network resources so as to meet or exceed service availability guarantees.

Descriptions of one or more examples are set forth in the description below. Other features, aspects, and advantages will become apparent from the description and the claims.

DESCRIPTION OF DRAWINGS

FIGS. 5a and 5b show resource allocation over a time period.

DETAILED DESCRIPTION

Figure 1:
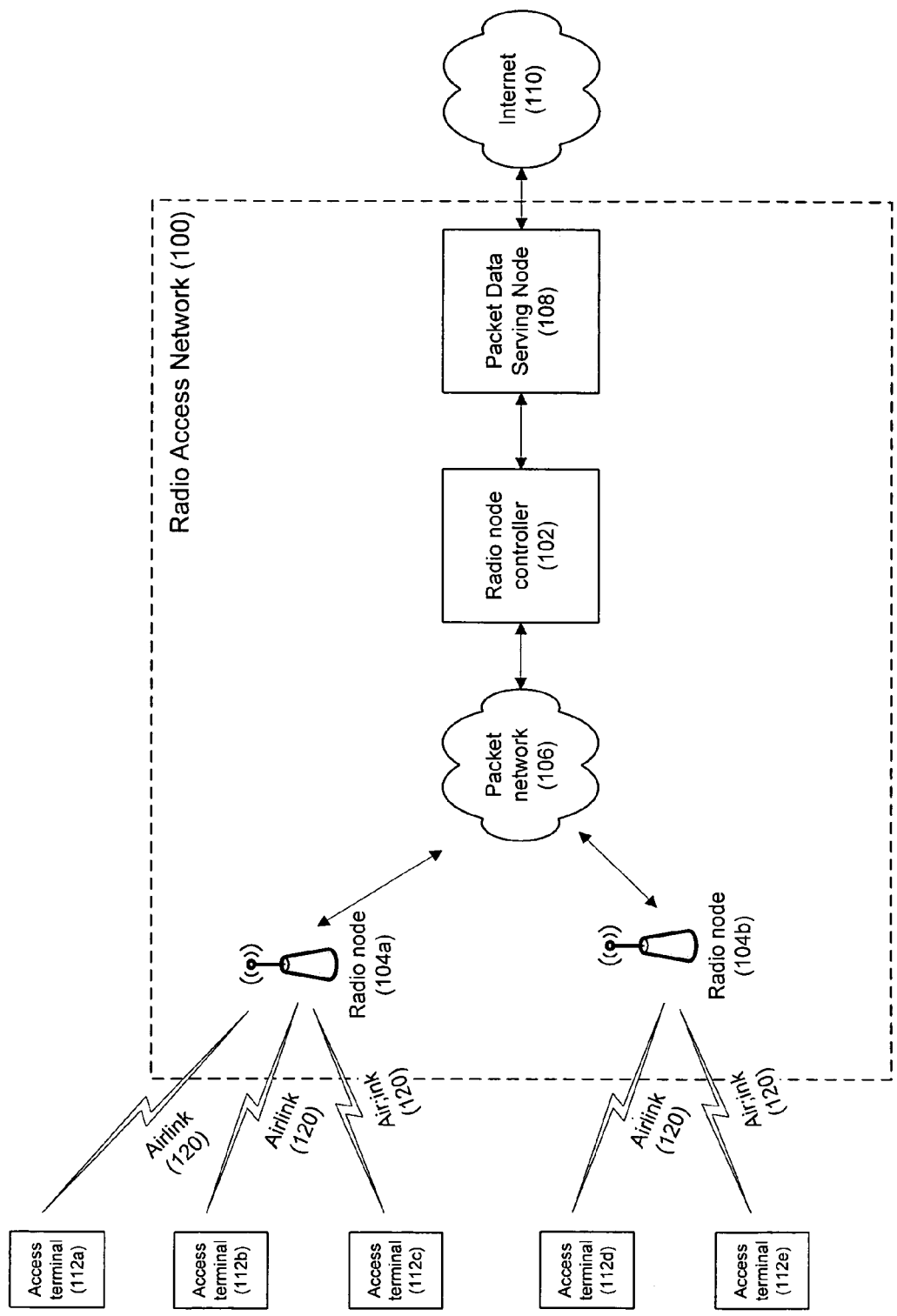
FIG. 1 is a block diagram of a radio access network.

FIG. 1 shows a 1xEV-DO, Rev. A radio access network 100 with a radio node controller 102 connected to two radio nodes 104a, 104b over a packet network 106. The packet network 106 can be implemented as an IP-based network that supports many-to-many connectivity between the radio nodes 104a, 104b and the radio node controller 102. The radio node controller 102 is connected to the Internet 110 via a packet data serving node 108. Other radio nodes, radio node controllers, and packet networks (not shown in FIG. 1) can be included in the radio access network 100.

Network resources are allocated to access terminals 112a-112f in order to enable the access terminals 112a-112f to communicate with the radio access network 100. Although there are several different types of network resources that are needed to establish a connection between each access terminal and the radio access network 100, the example techniques described below refer to a connection resource in a sector. The techniques are similarly applicable to the other types of network resources.

Figure 2:
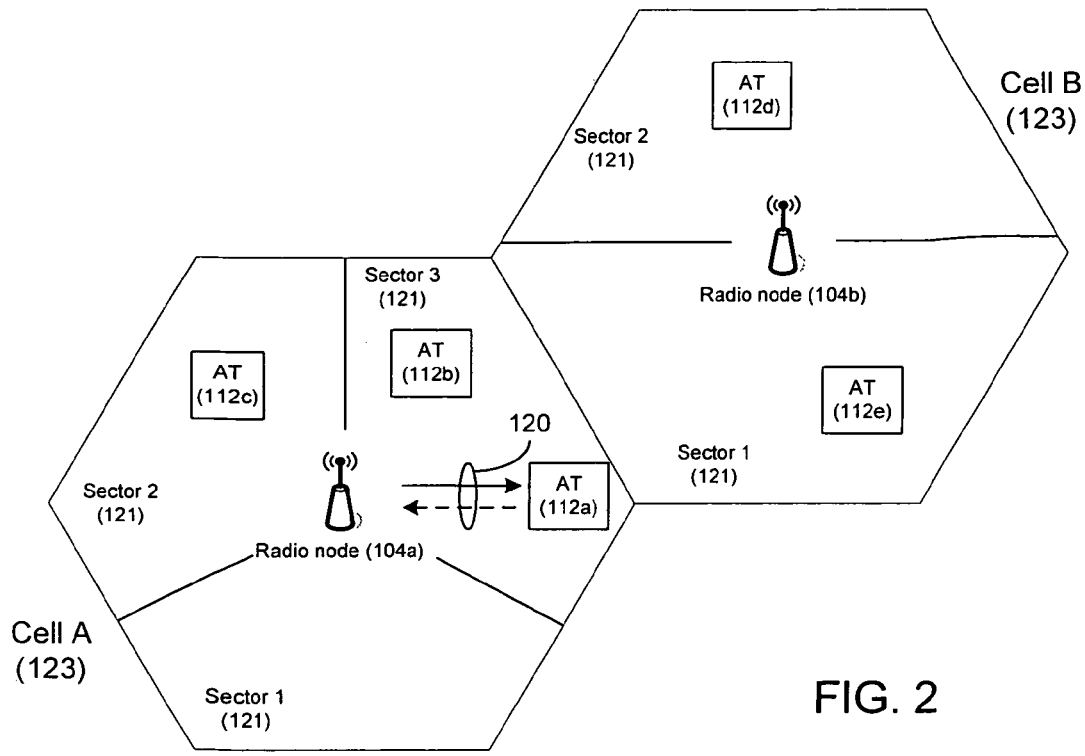
FIG. 2 shows cells of a radio access network.

Referring also to FIG. 2, each radio node 104a, 104b can support multiple sectors 121, with each sector covering a certain cell area 123 around the radio node 104a, 104b. Each active access terminal 112 is in communication with a radio node, e.g., radio node 104a, using an airlink 120. The airlink 120 comprises a forward traffic channel (depicted in FIG. 2 by a solid-lined arrow), which carries data transmitted from the radio node 104a to the access terminal 112a, and a reverse traffic channel (depicted in FIG. 2 by a broken-lined arrow), which carries data transmitted from the access terminal 112a to the radio node 104a.

Whenever the access terminal 112a sends a Connection-Request message over a reverse traffic channel along with a RouteUpdate message to initiate a new connection with the radio access network 100, the messages are immediately forwarded from the receiving radio node, e.g., radio node 104a, to its serving radio node controller, in this case, radio node controller 102 (FIG. 1). The serving radio node controller 102 examines the RouteUpdate message to determine a likely set of sectors that may be included in an active set for the access terminal 112a. Suppose the active set of sectors includes the sectors 121 that cover cell area A 123. The serving radio node controller 102 communicates with the radio node 104a where these sectors 121 reside to request connection resources. The radio node 104a allocates the sufficient connection resources to establish the connection. The serving radio node controller 102 then accepts the connection request, and causes the radio node 104a to send a TrafficChannel assignment essage over the forward traffic channel to the access terminal 112a. The access terminal 112a returns a ReverseTrafficChannel (RTC) indication on the reverse traffic channel. Once the radio node 104a acquires the RTC indication, the radio node sends a ReverseTrafficChannelAcknowledge (RTCAck) message to the access terminal 112a to indicate the acquisition of the RTC signal. The access terminal 112a then responds with a TrafficChannelComplete message to indicate the completion of the connection set-up.

In this procedure, each radio node 104a, 104b controls its own connection resources, with respect to both hardware resources available on the radio node and management of interference across its sectors. As a result, admission control is split between the radio node 104a, 104b and its serving radio node controller 102. Admission control involves determining, based on a number of factors, whether a new user is to be added to the network 100 given the new user's likely impact on the performance of existing users and network components. Examples of factors include the current resource usage by existing users, the resources requested by the new user, measurement of current network performance, and policies imposed by the network operator. Radio nodes 104a, 104b provide local admission control for the sectors they control while the serving radio node controller 102 provides a global admission control. The portions of each radio node 104a, 104b and its serving radio node controller 102 that perform the admission control function are collectively referred to in this description as an "admission control component" of the radio access network 100.

Figure 3:
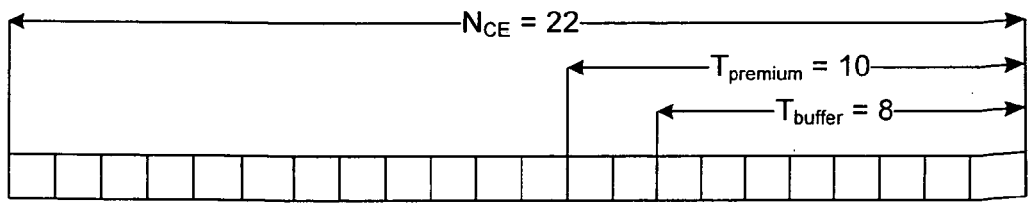
FIG. 3 shows available connection resources of a sector.

An admission control component of the radio access network 100 can be implemented to provide service availability guarantees even if a priority level of a connection cannot be determined at the time the connection is established. Referring to FIG. 3, suppose there are $N_{CE}$ connection resources available for a given sector and $T_{buffer,max}$ of the $N_{CE}$ connection resources are reserved for use by the admission control component as a staging area for new connections. Provision of a staging area enables access terminals to have a high connection set up success rate as the admission control component can allocate up to $T_{buffer,max}$ connection resources to new connections. The number of $T_{buffer,max}$ connection resources that are actually in use at any given time is represented by $T_{buffer}$, that is, $0 \leq T_{buffer} \leq T_{buffer,max}$. $T_{buffer,max}$ can be set or modified by the network operator to obtain a predetermined call blocking performance.

The network operator can establish a service availability guarantee for users of premium services ("premium users") in that sector by reserving at least $T_{premium}$ of the $N_{CE}$ connection resources for allocation to high priority level connections. Yet, instead of limiting users of best effort services ("regular users") to only the remaining $N_{CE}-T_{premium}$ connection resources, the admission control component can be implemented to allocate up to $N_{CE}-T_{buffer}$ connection resources.

Figure 4:
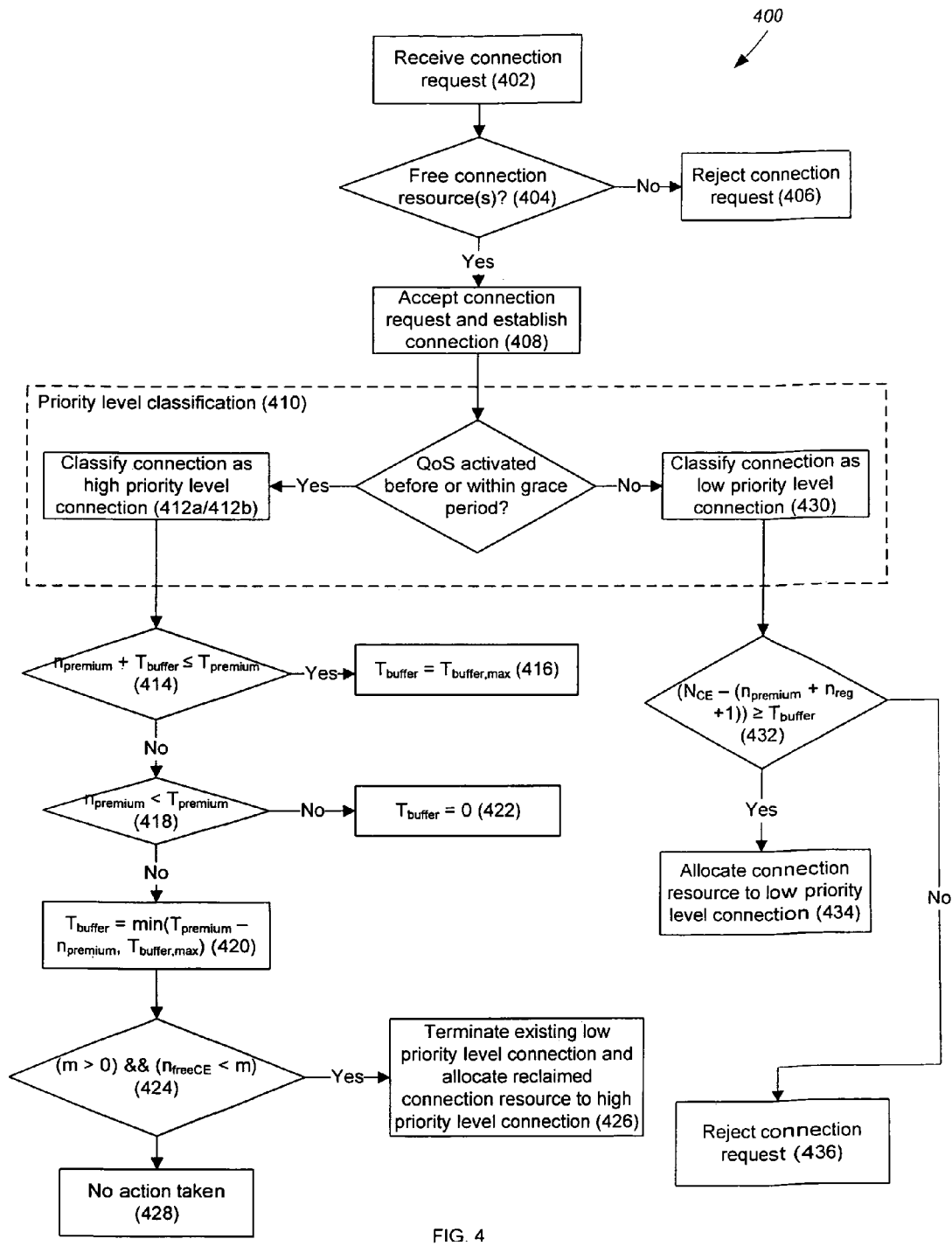
FIG. 4 is a flowchart of a resource allocation process.

FIG. 4 shows a resource allocation process 400 implemented by an admission control component of the radio access network 100. When a connection request is received (402), the admission control component first determines (404) whether the number of free connection resources $n_{freeCE}$ among the $N_{CE}$ connection resources is at least a large as the number of new connections requested. In some examples, $n_{freeCE}=N_{CE}-n_{reg}-n_{premium}-n_{trans}$, where $n_{reg}$ is the number of connection resources currently used by regular users, $n_{premium}$ is the number of connection resources currently used by premium users, and $n_{trans}$ is the number of connection resource currently allocated to transient connections (i.e., connections that the admission control component has not identified as a low or high priority level connection). If there are not enough free connection resources, the admission control component rejects (406) the connection request. Otherwise, the admission control component accepts (408) the connection request, establishes the connection, and increments $n_{trans}$ by 1. The connection remains in the staging area for a period of time (referred to as a "grace period") while the admission control component performs (410) a priority level classification of the connection.

In some examples, the connection is established with an access terminal that performs premium service negotiation and activation before the connection is set up. The admission control component classifies (412a) the connection as being a high priority level connection.

In some examples, the connection is established with an access terminal that performs premium service negotiation and activation after the establishment of the connection. The admission control component first classifies the connection as having a low priority level. Upon indication of a completion of the premium service activation process, the admission control component may upgrade the connection to a high priority level classification (412b).

Once a connection is classified as a high priority level classification, the admission control component increments $n_{premium}$ by 1 and decrements $n_{trans}$ by 1. The admission control component then checks to see if the size of $T_{buffer}$ is to be changed with the addition of a new premium user. In some examples, the admission control component first determines (414) if $n_{premium}+T_{buffer}<T_{premium}$. If the determination yields a positive result, then $T_{buffer}=T_{buffer,max}$ (416). In other words, the number of premium users on the network 100 has not exceeded the service availability guarantee for premium users, so the admission control component maintains the size of the staging area at its maximum in order to keep the call blocking probability low. If, however, the determination yields a negative result, then the admission control component performs (418) a check as follows: if $(n_{premium}<T_{premium})$ is true, then $T_{buffer}=\min(T_{premium}-n_{premium}, T_{buffer,max})$ (420), else $T_{buffer}=0$ (422). In other words, the admission control component can adjust the size of the staging area as the number of premium users on the network 100 meets or exceeds the service availability guarantee for premium users. In the event $T_{buffer}=0$, the staging area is removed and the admission control component accepts connection requests from access terminals on a first-come-first-serve basis as connection resources become available. The staging are is re-established only when $n_{premium}$ falls below $T_{premium}$. Thus, the staging area grows and contracts dynamically as connection resources are used and reclaimed.

In some instances, it may be necessary for the admission control component to terminate one or more low priority level connections in order to maintain the staging area at $T_{buffer,max}$ or $T_{buffer}$. In some examples, the admission control component determines (424) if low priority level connections are to be terminated using the following check: if $(m>0)$ and $(n_{freeCE}<m)$, where $m=\max(T_{buffer}-n_{trans}, 0)$ and $n_{freeCE}=(N_{CE}-n_{reg}-n_{premium}-n_{trans})$, then terminate (426) $(m-n_{freeCE})$ low priority level connections, otherwise take no action (428). Reclaiming a connection resource from a low priority level connection enables the admission control component to maintain the size of the staging area at $T_{buffer,max}$ or $T_{buffer}$, while allocating enough connection resources to the high priority level connections. Although the termination of low priority connections can result in a high call drop rate for the regular users, such cost can be justified if the network operators desires to guarantee low call blocking rate for high priority connections.

If the access terminal does not perform premium service negotiation and activation before the connection is set up or the premium service activation process fails to complete within the grace period, the access control component classifies (430) the connection as a low priority level connection by default. The admission control component then determines (432) whether $(N_{CE}-(n_{premium}+n_{reg}+1))>T_{buffer}$. A positive result (434) indicates that there are sufficient connection resources available for allocation to the low priority level connection, in which case the admission control component allocates the connection resource, increments $n_{reg}$ by 1 and decrements $n_{trans}$ by 1. Otherwise, the admission control component rejects (436) the connection request and decrements $n_{trans}$ by 1.

Figure 5A:
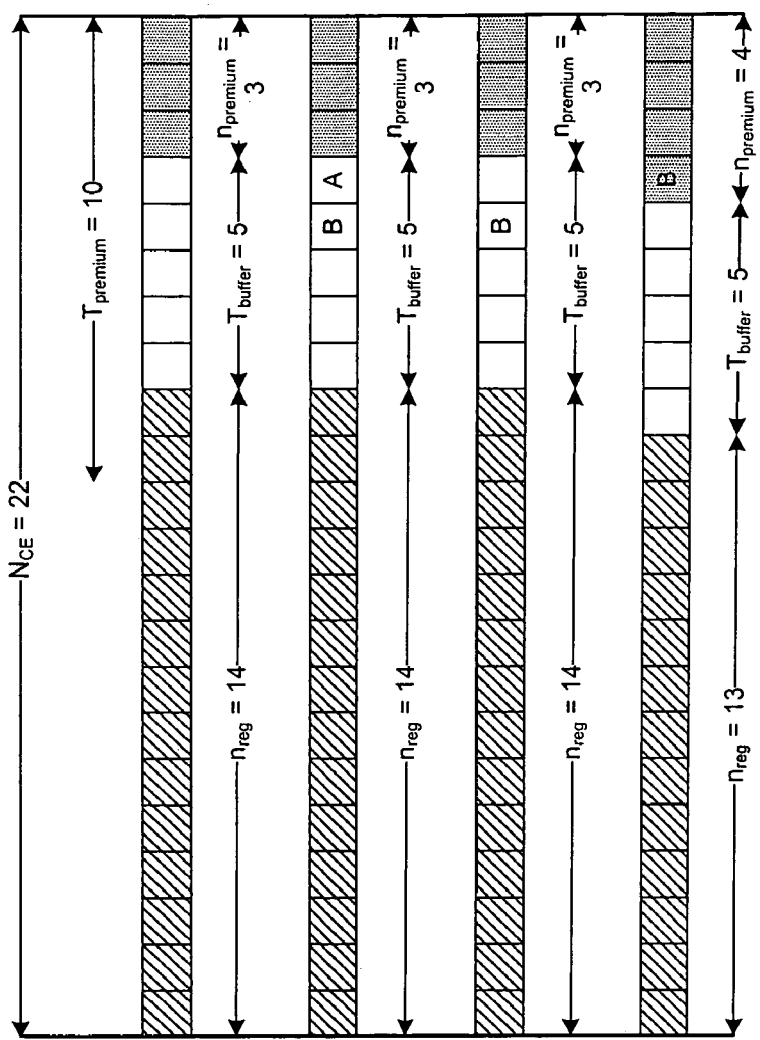

FIG. 5a shows an example of resource allocation of a sector by an admission control component of a radio access network over a period of time. In the illustrated example, there are 22 available connection resources for a given sector, and the network operator has established a service availability guarantee for premium users in that sector that reserves at least 10 of the 22 connection resources for allocation to high priority level connections. Regular user may use up to 14 of the 22 connection resources.

Suppose at time t=0, 14 connection resources are used by regular users, 3 connection resources are used by premium users, and $T_{buffer}$=5. In this example, $T_{buffer}$ is used as the staging area, although in other examples, the staging area may be outside of $T_{buffer}$ (as described below with reference to FIG. 5b).

At time t=1, two new connection requests are received. The admission control component determines that there are enough connection resources available for allocation to the new connections, and establishes the connections A and B using two of the available $T_{buffer}$ connection resources in the staging area. $n_{trans}$=2.

At time t=2 (during the grace period), the admission control component classifies the connection A as a low priority level connection and checks if $(N_{CE}-(n_{premium}+n_{reg}+1))\geq T_{buffer}$. The negative result indicates that counting the connection A towards nreg would result in the reduction of $T_{buffer}$ from 5 to 4. As this is an unacceptable outcome, the admission control component terminates the low priority level connection A, and decrements $n_{trans}$ by 1.

At time t=3 (during the grace period), the admission control component classifies the connection B as a high priority level connection, increments $n_{premium}$ by 1 and decrements $n_{trans}$ by 1. The admission control component then checks to see if the size of $T_{buffer}$ is to be changed with the addition of a new premium user. In some examples, the admission control component first determines if $n_{premium}+T_{buffer}\leq T_{premium}$. In this example, $n_{premium}(4)+T_{buffer}(5)<T_{premium}(10)$, so $T_{buffer}=T_{buffer,max}(5)$. The admission control component then determines if low priority level connections are to be terminated in order to maintain the staging area at $T_{buffer}=T_{buffer,max}(5)$ using the following check: if (m>0) and $(n_{freeCE}<m)$, where $m=\max(T_{buffer}(5)-n_{trans}(0),0)=5$ and $n_{freeCE}=(N_{CE}(22)-n_{reg}(14)-n_{premium}(4)-n_{tans}(0))=4$, then terminate $(m(5)-n_{freeCE}(4))=1$ low priority level connection.

FIG. 5b shows an example of resource allocation of a sector by an admission control component of a radio access network over a period of time. In the illustrated example, there are 22 available connection resources for a given sector, and the network operator has established a service availability guarantee for premium users in that sector that reserves at least 10 of the 22 connection resources for allocation to high priority level connections. Regular user may use up to 14 of the 22 connection resources.

Suppose at time t=0, 4 connection resources are used by regular users, 3 connection resources are used by premium users, and $T_{buffer}$=5.

At time t=1, three new connection requests are received. The admission control component determines that there are enough connection resources available for allocation to the new connections, and establishes the connections C, D, and E using three of the free connection resources that are outside of $T_{buffer}$, that is, the staging area in this example is outside $T_{buffer}$. $n_{trans}$=3.

At time t=2 (during the grace period), the admission control component classifies all three connections C, D, and E as high priority level connections, increments $n_{premium}$ by 3 and decrements $n_{trans}$ by 3. The admission control component then checks to see if the size of $T_{buffer}$ is to be changed with the addition of the three new premium users. In some examples, the admission control component first determines if $n_{premium}+T_{buffer}\leq T_{premium}$. In this example, since $n_{premium}(6)+T_{buffer}(5)>T_{premium}(10)$, the admission control component performs a check as follows: if $(n_{premium}<T_{premium})$ is true, then $T_{buffer}=\min(T_{premium}-n_{premium}, T_{buffer,max})$. As $n_{premium}(6)<T_{premium}(10)$, the admission control component adjusts $T_{buffer}$ to have a size of $T_{buffer}=\min(T_{premium}(10)-n_{premium}(6), T_{buffer,max}(5))=4$. The admission control component then determines if low priority level connections are to be terminated in order to maintain the staging area at $T_{buffer}$=4. To do so, the admission control component determines the values of m and $n_{freeCE}$, where $m=\max(T_{buffer}(4)-n_{trans}(0),0)=4$ and $n_{freeCE}=(N_{CE}(22)-n_{reg}(4)-n_{premium}(6)-n_{trans}(0))=12$. Since m(4) is greater than 0 but $n_{freeCE}(12)$ is not less than m(4), no low priority level connections need to be terminated in order to maintain the staging area at $T_{buffer}$=4.

By allowing the regular users to be allocated up to $N_{CE}-T_{buffer}$ connection resources and constantly changing the mix of available high and low priority level connections, network operators can guarantee certain levels of performance to premium users in accordance with established service availability guarantees, while optimizing resource utilization.

Although the techniques described above employ the 1xEV-DO air interface standard, the techniques are also applicable to other CDMA and non-CDMA air interface technologies in which premium services are available for use.

The techniques described above can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry. Other embodiments are within the scope of the following claims.

The invention claimed is:

1. A method comprising:
   enabling a radio access network to provide a service availability guarantee to a user of a premium service without requiring the radio access network to identify, prior to connection establishment, a priority level of a connection with an access terminal associated with the user; wherein enabling the radio access network to provide the service availability guarantee comprises:
      establishing the connection with the access terminal;
      classifying the connection as having a low priority level;
      maintaining the connection for a period of time while the priority level is identified; and
      upgrading the connection to a high priority level if the priority level is identified as the high priority level, the high priority level being a higher priority level relative to the low priority level.

2. The method of claim 1, wherein enabling the radio access network to provide the service availability guarantee further comprises:
   establishing a session for the access terminal on the radio access network; and
   identifying the priority level based on session information.

3. The method of claim 2, wherein establishing the session comprises:
   establishing the session prior to connection establishment.

4. The method of claim 2, wherein establishing the session comprises:
   establishing the session after connection establishment.

5. The method of claim 2, wherein the session information comprises an activated service identifier.

6. The method of claim 5, wherein the activated service identifier comprises a premium service identifier or a regular service identifier.

7. The method of claim 2 wherein enabling the radio access network to provide the service availability guarantee further comprises:
   identifying the priority level as one of at least two priority levels.

8. The method of claim 2 wherein enabling the radio access network to provide the service availability guarantee further comprises:
   identifying the priority level as the low priority level or the high priority level.

9. The method of claim 1, wherein enabling the radio access network to provide the service availability guarantee further comprises:
   allocating a resource of the radio access network to the connection based on the priority level.

10. The method of claim 1, wherein enabling the radio access network to provide the service availability guarantee further comprises:
    determining whether a resource of the radio access network is to be allocated to the connection based on the priority level.

11. The method of claim 1, wherein enabling the radio access network to provide the service availability guarantee further comprises:
    determining whether a resource of the radio access network is available for allocation to the connection based on the priority level.

12. The method of claim 1, wherein enabling the radio access network to provide the service availability guarantee further comprises:
    terminating the connection if the priority level cannot be identified within the period of time.

13. The method of claim 1, wherein enabling the radio access network to provide the service availability guarantee further comprises:
    terminating a first connection in order to reclaim an allocated resource of the radio access network for subsequent allocation to a second connection, the second connection having a relatively higher priority level than the first connection.

14. A computer readable storage medium that stores executable instructions for use at a radio node controller of a radio access network, the computer readable storage medium being a tangible medium, the instructions for causing one or more processors to:
    provide a service availability guarantee to a user of a premium service without requiring the radio access network to identify, prior to connection establishment, a priority level of a connection with an access terminal associated with the user; wherein providing the service availability guarantee comprises:
       establishing the connection with the access terminal;
       classifying the connection as having a low priority level;
       maintaining the connection for a period of time while the priority level is identified; and
       upgrading the connection to a high priority level if the priority level is identified as the high priority level, the high priority level being a higher priority level relative to the low priority level.

15. The computer readable storage medium of claim 14, wherein providing the service availability guarantee further comprises:
    determining whether a resource of the radio access network is to be allocated to the connection based on the priority level.

16. The computer readable storage medium of claim 14, wherein providing the service availability guarantee further comprises:
    determining whether a resource of the radio access network is available for allocation to the connection based on the priority level.

17. The computer readable storage medium of claim 14, wherein providing the service availability guarantee further comprises:
    terminating the connection if the priority level cannot be identified within the period of time.

18. The computer readable storage medium of claim 14, wherein providing the service availability guarantee further comprises:
    terminating a first connection in order to reclaim an allocated resource of the radio access network for subsequent allocation to a second connection, the second connection having a relatively higher priority level than the first connection.

19. A radio access network device in a radio access network, comprising:
    memory configured to store instructions for execution; and
    one or more processors configured to execute the instructions, the instructions for causing the one or more processors to:
       provide a service availability guarantee to a user of a premium service without requiring the radio access network to identify, prior to connection establishment, a priority level of a connection with an access terminal associated with the user; wherein providing the service availability guarantee comprises:

establishing the connection with the access terminal;
classifying the connection as having a low priority level;
maintaining the connection for a period of time while the priority level is identified; and
upgrading the connection to a high priority level if the priority level is identified as the high priority level, the high priority level being a higher priority level relative to the low priority level.

20. The radio access network device of claim 19, wherein the radio access network device comprises a radio network controller.

21. The radio access network device of claim 19, wherein the radio access network device comprises a radio node.

22. The radio access network device of claim 19, wherein providing the service availability guarantee further comprises:
determining whether a resource of the radio access network is to be allocated to the connection based on the priority level.

23. The radio access network device of claim 19, wherein providing the service availability guarantee further comprises:
determining whether a resource of the radio access network is available for allocation to the connection based on the priority level.

24. The radio access network device of claim 19, wherein providing the service availability guarantee further comprises:
terminating the connection if the priority level cannot be identified within the period of time.

25. The radio access network device of claim 19, wherein providing the service availability guarantee further comprises:
terminating a first connection in order to reclaim an allocated resource of the radio access network for subsequent allocation to a second connection, the second connection having a relatively higher priority level than the first connection.

26. A method comprising:
enabling a radio access network to provide a service availability guarantee to a user of a premium service without requiring the radio access network to identify, prior to connection establishment, a priority level of a connection with an access terminal associated with the user; wherein enabling the radio access network to provide the service availability guarantee comprises:
establishing the connection with the access terminal;
maintaining the connection for a period of time while the priority level is identified; and
terminating the connection if the priority level cannot be identified within the period of time.

27. A computer readable storage medium that stores executable instructions for use at a radio node controller of a radio access network, the computer readable storage medium being a tangible medium, the instructions for causing one or more processors to:
provide a service availability guarantee to a user of a premium service without requiring the radio access network to identify, prior to connection establishment, a priority level of a connection with an access terminal associated with the user; wherein providing the service availability guarantee comprises:
establishing the connection with the access terminal;
maintaining the connection for a period of time while the priority level is identified; and
terminating the connection if the priority level cannot be identified within the period of time.

28. A radio access network device in a radio access network, comprising:
memory configured to store instructions for execution; and
one or more processors configured to execute the instructions, the instructions for causing the one or more processors to:
provide a service availability guarantee to a user of a premium service without requiring the radio access network to identify, prior to connection establishment, a priority level of a connection with an access terminal associated with the user; wherein providing the service availability guarantee comprises:
establishing the connection with the access terminal;
maintaining the connection for a period of time while the priority level is identified; and
terminating the connection if the priority level cannot be identified within the period of time.

* * * * *